United States Patent [19]

Koike

[11] Patent Number: 4,574,370
[45] Date of Patent: Mar. 4, 1986

[54] SOUND REPRODUCTION SELECTION APPARATUS FOR A SIMPLIFIED SOUND REPRODUCING DEVICE

[75] Inventor: Eishi Koike, Sagamihara, Japan

[73] Assignee: Ozen Corporation, Tokyo, Japan

[21] Appl. No.: 691,839

[22] Filed: Jan. 16, 1985

[30] Foreign Application Priority Data

Aug. 23, 1984 [JP] Japan .................... 59-175535

[51] Int. Cl.$^4$ .................... G11B 3/40; G11B 17/00
[52] U.S. Cl. .................... 369/65; 369/63; 369/67; 369/177
[58] Field of Search .................... 369/63, 65, 66, 67, 369/177

[56] References Cited

U.S. PATENT DOCUMENTS

| | | | |
|---|---|---|---|
| 4,123,065 | 10/1978 | Watanabe | 369/63 |
| 4,195,844 | 4/1980 | Okamura et al. | 367/177 |
| 4,404,667 | 9/1983 | Koike | 369/65 |
| 4,404,668 | 9/1983 | Watanabe | 369/65 |
| 4,485,466 | 11/1984 | Fekete | 369/63 |

FOREIGN PATENT DOCUMENTS 2038072 7/1980 United Kingdom .................... 369/66

Primary Examiner—Steven L. Stephan
Attorney, Agent, or Firm—Basile, Weintraub & Hanlon

[57] ABSTRACT

A stopper projects radially outward from the periphery of a rotary turn table and a plurality of selection poles are disposed such that any one of the selection poles, when depressed, projects into the locus of rotation of the stopper. A spring fabricated to have energizing pieces, the same in number as the number of selection poles, is positioned within a casing so that two mating parts can engage with each other. Each energizing piece is made electrically conductive and the spring also urges each selection pole toward the outside of the casing. A metal guide plate holds the selection poles 16 which are disposed along the periphery of the turn table within the casing and further guides the selected selection pole into the locus of rotation of the stopper. The selected selection pole will urge corresponding spring into engagement with the guide plate. Each selection pole is provided with a projection which urges the spring into contact with the metal guide plate when any one of the selection poles is depressed from outside of the casing. Furthermore, a circuit between a motor and a power source is connected to both the metal spring and the metal guide plate to cause these two parts to act as a pair of mating contacts in a selection switch.

5 Claims, 8 Drawing Figures

SOUND REPRODUCTION SELECTION APPARATUS FOR A SIMPLIFIED SOUND REPRODUCING DEVICE

BACKGROUND OF THE INVENTION

1. Field of the Invention

This invention relates to a simplified sound reproducing device and, more particularly, to a sound reproducing device having a reproduction selection mechanism in which a record disc having a plurality of record grooves and an indexing portion showing respective recorded items on the disc is mounted in a record holder tiltably attached to a casing so that any one desired recorded item can be selected on the record disc.

2. Description of the Prior Art

There have been provided simplified sound reproducing devices carrying a record holder which include a casing having a window, a tone arm having a swingable sound reproducing stylus projecting toward the window supported by a sound transmitting member which is normally biasing toward a starting point of sound reproduction on the record disc, a speaker diaphragm attached to a face of the record disc opposite to which the tone arm is engageable, a turn table supported in the casing by a center pin so as to be rotatably driven by a motor, a record holder swingably attached to the margin of a window-like aperture on the casing and having on its end portion a record disc fixing portion which is resiliently ejected by an opening spring to move tiltably away from the window and is swingably moved back, in parallel, to the turn table when it is pushed against the force of the spring, and a record disc having a plurality of record grooves, each starting point of which is spaced apart along the circumference of the record disc, and an indexing portion showing each of the recorded items wherein the record face can be engaged with the reproducing stylus when the record holder is pushed against the spring, while the record disc can be set in the record holder with the indexing portion being visible from outside of the casing.

Also, there have been disclosed a simplified sound reproducing device including a reproduction selection means that can temporarily stop the reproduction stylus at a position where the stylus can engage the selected recorded groove on the record disc by manipulating selection poles corresponding in number to the number of the record grooves.

The prior art also discloses a simplified sound reproducing device capable of performing selective reproduction by utilizing contiguous spring energizing pieces which extend radially outward with respect to each other and urge the selection poles normally toward the outside of the casing of the sound reproducing device. However, such a sound reproducing device has yet been constructed with a record holder that receives and holds a record disc having a plurality of record grooves in which any desired item recorded on the record disc can be selected by the selection poles.

The problems of a complicated construction required in combining the use of a selection pole for selecting a recorded item or items to be reproduced with the provision for holding the record disc by a record holder in order to obtain a sound reproducing device which holds in its record holder a record disc carrying a plurality of record grooves, and yet can select and reproduce any desired recorded items by means of selection poles has not been fully and satisfactorily addressed by the prior art. Accordingly, such devices have necessitated high production costs, together with insufficient operability in reproduction.

This invention aims to obviate such problems as mentioned above. Accordingly, an object of the present invention is to provide a sound reproducing device of simplified construction which is capable of holding a record disc carrying a plurality of recorded grooves and yet is able to select and reproduce any desired record groove by manipulating selection poles. Another object of the present invention is to provide a selective reproducing means of precise performance for a simplified sound reproducing device. A still further object of the invention is to provide a simplified reproducing device consisting of a minimum number of components which result in an attendant lower manufacturing cost.

SUMMARY OF THE INVENTION

In order to accomplish the above-mentioned objects, the present invention adopts a construction, namely, the device consists of a simplified sound reproducing device which includes: a casing having a window or aperture, a tone arm carrying a sound reproducing stylus projecting toward the window 1 and which is swingably attached to the casing and normally urged toward the starting point of sound reproduction while on the record disc supported by a sound transmitting member. A speaker diaphragm is attached to a portion opposite to the face of the record disc where the tone arm is swingably attached. A turn table is supported by a center pin in the casing so as to be rotatably driven by a motor. A record holder is swingably attached at one end to the rim of the casing and has a record disc fixing portion formed at its other end which is capable of being resiliently ejected by an opening spring so that the record disc fixing portion can be tiltably moved away from the rim of the window. At the same time, the record disc fixing portion can be returned to a parallel position with the turn table when it is pushed against the force imparted by the opening spring. A record disc having a plurality of record grooves each of their starting points being circumferentially spaced apart on the disc and an indexing portion is arranged such that any record groove can be engaged by the reproducing stylus when the record holder is pushed against the opening spring and the record disc is being held in the record disc fixing portion with the indexing portion of the record disc being visible from outside of the casing. This type of simplified sound reproducing device is combined with a selective reproduction mechanism which can temporarily stop the reproducing stylus at a position where it can engage a specific record groove containing the selected item among all the items on the record disc.

In order to attain the aforesaid objects, the device of the present invention includes a stopper which radially projects from the outer periphery of the turn table and selection poles which are positioned so as to project on the rotational locus of the stopper when any one of the selection poles is depressed from the outside of the casing. A plurality of energizing pieces corresponding in number to the selection poles are connected to the selection poles and are electrically connected with each other. A metal spring which normally urges each of the selection poles toward the outside of the casing are arranged to face a metal guide place disposed along the periphery of the turn table so as to hold the selection poles within the casing and to guide one of the selection poles to the locus of rotation of the stopper provided on the turn table. A plurality of projections, one provided on each selection pole and urge the spring to contact the metal guide plate when one of the selection poles is depressed. In addition, the spring and the guide plate are connected in a circuit between the motor and an electric power source so as to make these two parts play a role as an electrical contact for a selection switch.

Since each selection pole of the present invention is normally urged by the spring which also acts as a switch contact, toward the outside of the casing and is also guided by the guide plate which also acts as a switch contact, so as to be projected onto the locus of rotation of the stopper, the simplified sound reproducing device coupled with a swingably tiltably record holder can be constructed as a simplified sound reproducing device capable of effecting selective sound reproduction without requiring any particular switching means for selective sound reproduction, other than the mechanism for actuating the selection poles.

According to the present invention, a sound reproduction device of simplified construction can be provided; the record holder of which can hold a record disc having a plurality of record grooves and yet is capable of selectively reproducing any desired record groove by the operating selection poles. Moreover, the sound reproducing device of the present invention can function exactly, and yet can be made with minimum number of parts resulting in a lower manufacturing cost.

BRIEF DESCRIPTION OF THE DRAWING

The various features, advantages and other uses of the present invention will become more apparent by referring to the following detailed description and drawing in which.

DETAILED DESCRIPTION OF THE PREFERRED EMBODIMENTS

Figure 1:
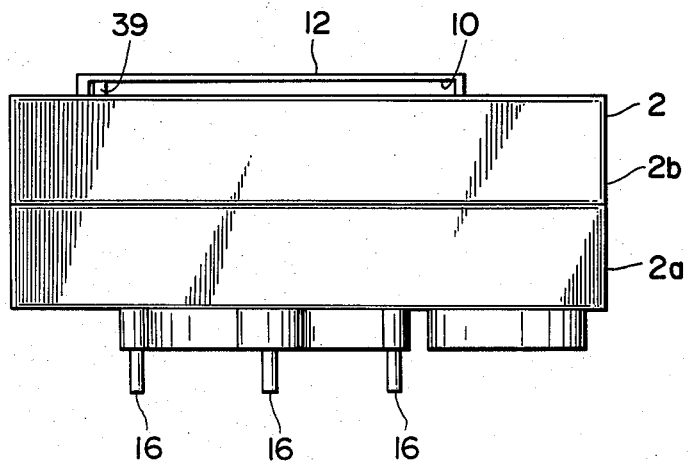
FIG. 1 is a top, plan view of a preferred embodiment of the present invention.

As shown in FIGS. 1-5, a casing 2 in a preferred embodiment of the present invention, as a whole, has a rectangular configuration formed of a chassis 2a covered by a housing 2b. The chassis 2a is formed with a motor holder 23 of circular configuration in plan view and a sound outlet projection 24. The circular outer face of the sound outlet projection 24 has a number of sound outlets 25 extending therethrough.

A square window 1 is formed on the top face of the housing 2b into which a record holder 12 is swingably attached at one end to the window 1 so as to be swingably urged into or swingably moved away from the window 1. The record holder 12 has, at one side face a slit-like opening which constitutes a record disc fixing portion 10 which is normally positioned at the top of the housing 2b.

Figure 3:
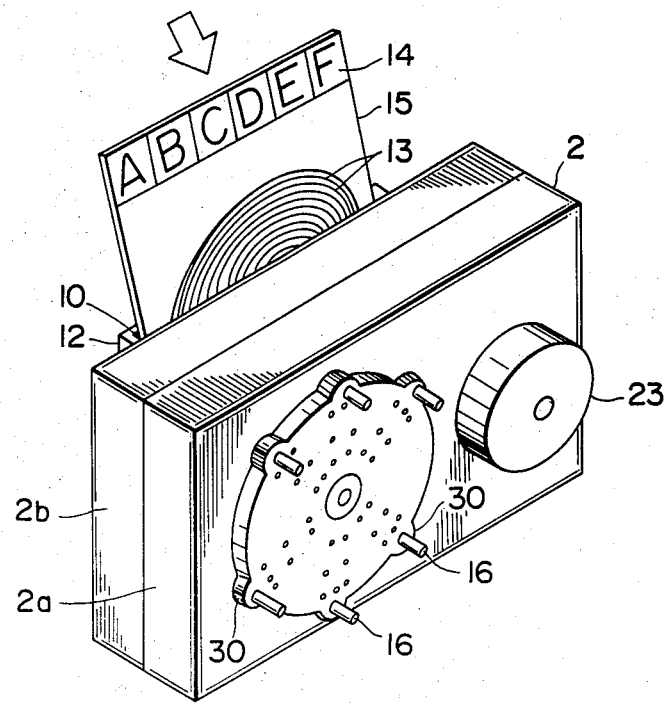
FIG. 3 is a rear, perspective view of the embodiment shown in FIG. 1.

A record disc 15 is insertable through the slit-like opening in the direction shown by a thick arrow line in FIG. 3 into the record disc fixing portion 10, when the record holder 12 is tilted and moved away from the window 1. The record disc is set and held in a fixed position in the record holder 12 when the record holder 12 is swung back into the window 1.

Moreover, the record disc 15 has on one side surface a plurality, preferably record grooves 13 each carrying different recorded items, and on its periphery an indexing portion 14 depicting the content of recorded items on the recorded grooves.

Figure 5:
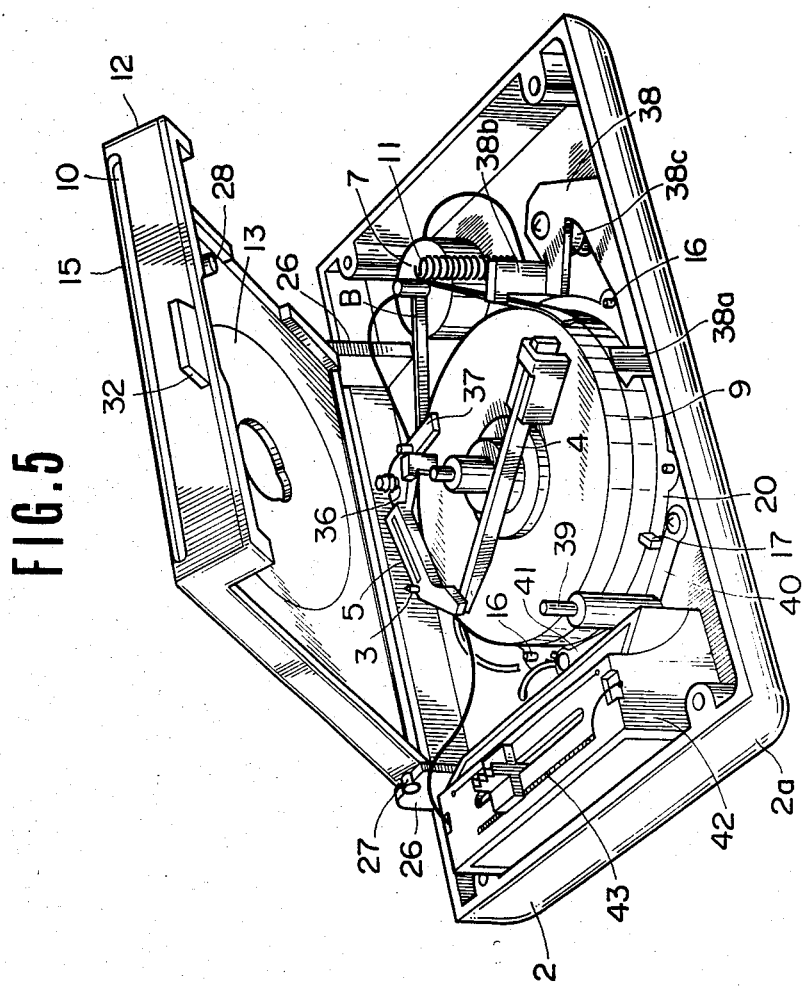
FIG. 5 is a top perspective view thereof with the housing removed.

FIG. 5 shows the sound reproducing device in perspective with its housing 2b removed in order that the construction of the sound reproducing device can be clearly observed.

The chassis 2a is provided with a recessed portion which constitutes a sound outlet projection 24 and, at the central part thereof, an upright center pin 8. A turn table 9 is supported around the center pin 8 for free rotation. The manner by which the turn table 9 is supported by said center pin, is shown in FIG. 8 in a partially enlarged, side sectional view.

Figure 2:
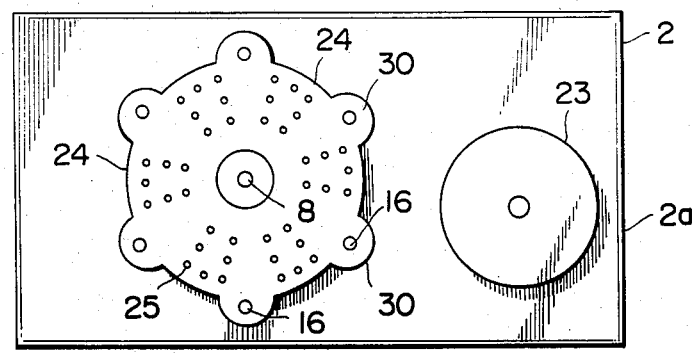
FIG. 2 is a bottom view of the embodiment shown in FIG. 1.

A motor holder 23, as shown in FIGS. 2 and 3, is formed in the chassis 2 in the same manner of the sound outlet projection 24. A motor 7 is fitted and held tightly within the motor holder 23. In this embodiment, the motor 7 and the turn table 9 are connected by a belt B. However, alternatively, the motor 7 and the turn table 9 can be coupled by a rim drive means with each other in which the output shaft of the motor 7 directly engages the rim of the turn table 9.

An opening spring denoted by reference numeral 11 in FIG. 5 is disposed upright in the chassis 2a and resiliently biases the record holder 12 which is journally supported by a trunnion pin 27 at a pair of bearings 26 disposed at one side of the chassis 2a. Due to this construction, the record holder 12 is normally urged to move in a direction away from the window 1. In FIG. 5, reference numeral 28 depicts a post mounted on the record holder 12 for receiving the opening spring 11.

Figure 8:
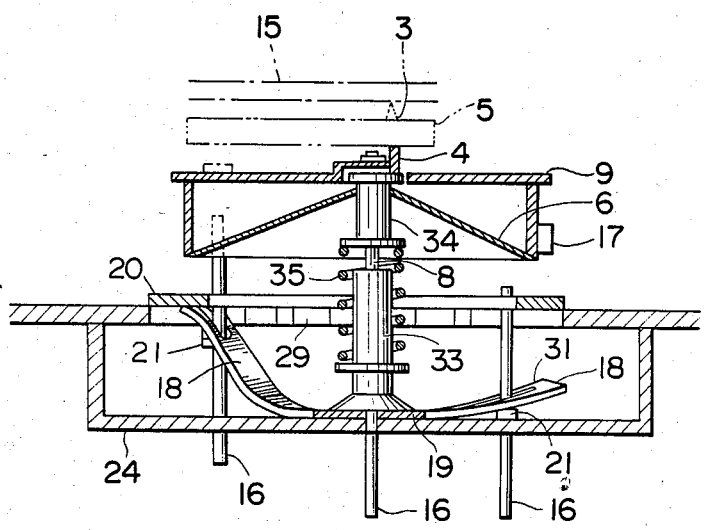
FIG. 8 is an enlarged, sectional view showing a major part of the present invention.

As particularly shown in FIG. 8, the inlet margin of the recessed portion of the chassis 2a is circular in shape. Along the periphery of the turn table 9, a plurality of projections 29 are equally spaced apart along the inner periphery of the inlet margin, onto which a metal guide plate 20 is fixedly disposed. The guide plate 20 is formed as an annular ring having an outside diameter larger than the outside diameter of the turn table 9 and an inner diameter smaller than the outside diameter of the turn table 9. A plurality of guide holes are equally spaced apart along the ring and at a position exteriorly of the outside diameter of the turn table 9 through which a selection pole 16 passes. The selection poles 16 pass through apertures formed in the bearing 30 so as to be movable in an axial direction.

Figure 7:
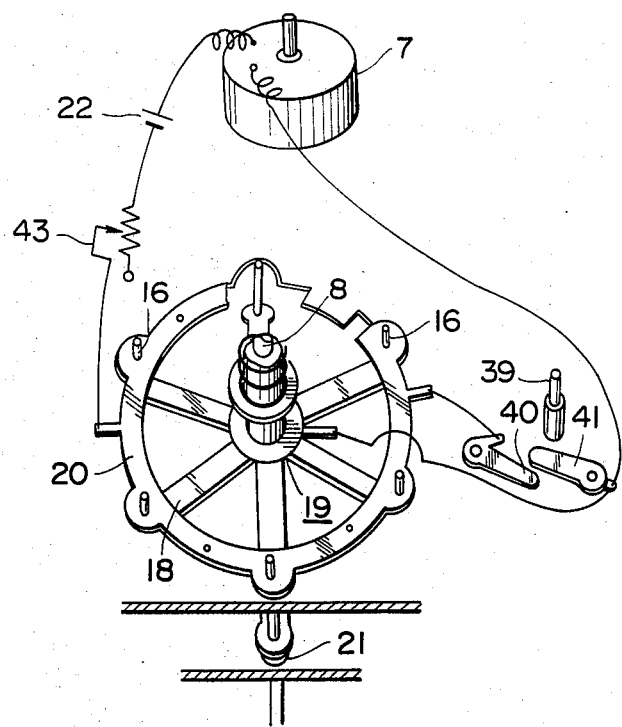
FIG. 7 is a schematic and partial perspective view showing the electric circuit of the sound reproducing device.

As can be clearly seen from FIGS. 7 and 8, a metal spring 19 consisting of a central mounting portion fixed around the center pin 8 and a plurality of energizing pieces 18 radially extending from the central mounting portion is received within the recess of the sound outlet projection 24. The metal spring 19 is formed to contact the confronting face of the metal guide plate 20 when it is bent at the tip end of each energizing piece 18 against its inherent resilient force and is moved toward the metal guide plate 20.

At each tip portion of the metal spring 19, there is also formed an oblong hole 31 which extends in a lengthwise direction and through which each selection pole 16 is inserted. Each selection pole 16 has, at the portion adjacent to the bottom of the recessed sound outlet portion 24, a flange-like projection 21 having a diameter larger than the width of each oblong hole 31 and is normally biased by the energizing piece through the projection 21 toward the sound outlet portion 24. Therefore, when the selection pole 16 is advanced into the casing 2 it would push the energizing piece 18 against its resilient force in a direction to contact the mating face of the metal guide plate 20.

As mentioned above, when the selection pole 16 is advanced into the casing 2, the forward tip end of each selection pole 16 will take a position parallel with the peripheral side face of the turn table 9.

On the other hand, the turn table 9 is provided with a stopper 17 projecting rapidly outward at the lower part of the side periphery. The stopper 17 will rotate together with the turn table 9, and tracks a circular locus of rotation at the outer periphery of the turn table 9. The tip end of the selection pole 16, when it is pushed into the casing 2, will advance to the circular locus drawn by the rotation of the stopper 17.

In addition, rotational side periphery of the turn table 9 also acts as a pulley at all portions where it is not provided with the stopper 17.

The turn table 9, as particularly clearly shown in FIG. 8, is formed as a hollow cylinder with a bottom end and its lower part being opened, into which a downwardly directed speaker diaphragm 6 is concentrically fixed with its continuously expanding periphery being attached to the lower end rim of the turn table 9. At the central part of the speaker diaphragm 6 an acoustic cylinder 34 having flanges at both the upper and lower ends is fixed through the center pin 8 which also passes through the acoustic cylinder 34 to the central part of the speaker diaphragm 6. Thus, the turn table 9 is supported by the acoustic cylinder 34 around the center pin 8 for free rotation. The flange at the upper end of the acoustic cylinder 34 is disposed above the turn table 9 to which the free end of the bar shaped sound transmitting member 4 supported as a cantilever is attached with its free end supported.

The center pin 8 also carries a cylindrical shaft 33 having a flange at its lower end, such that the acoustic cylinder 34 is disposed co-axially above the cylindrical shaft 33 so as to be co-axially aligned with and spaced apart at a slight distance from the cylindrical shaft 33. Between the flange at the lower end of the acoustic cylinder 34 and the flange formed on the lower end of the cylindrical shaft 33, a stylus pressure spring 35 is disposed to resiliently support the turn table 9 through the acoustic cylinder 34.

Figure 6:
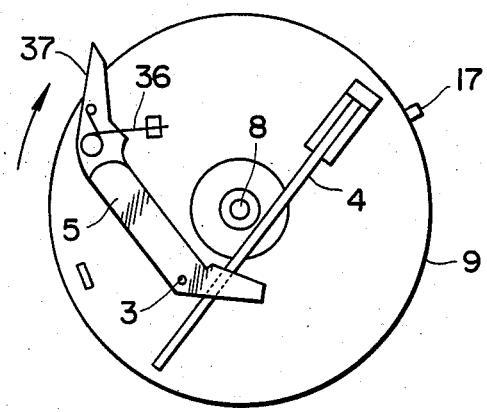
FIG. 6 is a plan view of the turn table.

As can be seen in FIGS. 5 and 6, the sound transmitting member 4 is supported above the turn table 9 received for relative slidable motion, the forward end of the tone arm 5, which is swingably supported at its rear end so as to be swung along the upper face of the turn table 9. On the upper face of the forward end of the tone arm 5, there is provided a sound reproducing stylus 3 projecting toward the recorded face of the record disc 3, and forming a pickup. FIG. 6, reference numeral 36, depicts a return spring, by which the portion of the pickup is normally urged toward the starting point of sound reproduction on the record grooves of the record disc.

The rear end of the tone arms is slightly extended to constitute a cancel lever 37. This cancel lever 37, as particularly shown in FIG. 6, projects radially outward from the upper face of the turn table 9 when the pickup approaches the central part of the record disc 15, such as upon arrival of the turn table 9 at the end point of reproduction located near the central part of the turn table 9. On the other hand, when the pickup is located at the radially outer portion of the turn table 9, the cancel lever 37 remains within the upper face of the turn table 9.

Alongside the turn table 9 within the chassis 2a, a holder locking lever 38 is supported to be swingably moved in a direction transverse to the axis of rotation of the turn table 9. The holder locking lever 38 has, at its one end, a downwardly facing hook 38a, and at the opposite end across the swivel point, a driven piece 38b upstanding up to the upper face of the turn table 9, and at the swivel point, a spring 38c is attached so that the hook 38a can be urged toward a locking piece 32 mounted on one side wall of the record holder 12.

Figure 4:
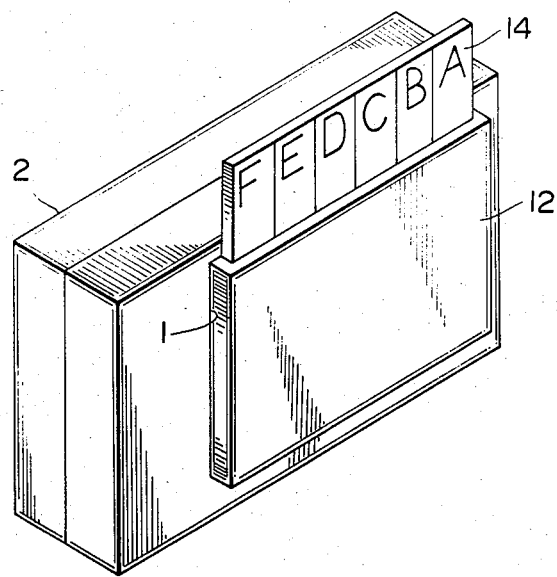
FIG. 4 is a front perspective view thereof.

Thus, when the record holder 12 is pushed and fixed in the window 1 as shown in FIG. 4, the hook 38a engages the locking piece 32 provided on the record holder 12, thereby holding the record holder 12 in a position such that the record disc 15 can be held within the record fixing portion 10 in engagement with the reproduction stylus 3 as shown by a dash and dot lines shown in FIG. 8.

On the other hand, when the pickup of the tone arm 5 arrives at the end point of sound reproduction and the cancel lever 37 projects radially outside the turn table 9 as shown in FIG. 6, the cancel lever 37 will engage the driven piece 38b due to the rotation of the turn table as shown in FIG. 5, and push the driven piece 38b.

By this movement, the hook 38a will rotate against the urging of the spring 38c to move away from the locking piece 32, thereby releasing the locking piece 32 from its locking action and the record holder 12 will be swingably moved by the opening spring 11 to move away from the window 1, so the record disc 15 can also be released from engagement with the reproducing stylus 3.

Reference numeral 39 shown in FIGS. 5 and 7 depicts a start switch button, reference numeral 40 denotes one contact of the start switch and reference numeral 41 the other contact of the start switch button 39 is disposed above the contact 40 and is normally maintained in an OFF position. The start switch button 39 is disposed above the contact 41 so as to be freely advanced or retracted. When the record holder 12 is pushed into the window 1 as shown in FIG. 1, the upper part of the start switch button 39 will advance into the record fixing portion 10 by the resilient force of the contact 41 and acts as an inhibitor to prevent the record disc 15 from being inserted into the record disc fixing portion 10. Accordingly, the record disc 15 can be inserted and held in the record holder 12 only when the record holder 12 has been swingably moved away from the window 1 as shown in FIG. 3. Also, when the record holder 12 is inserted into the window 1 with its fixing portion 10 containing a record disc 15, the record disc 15 will naturally be at the set position engageable with the reproduction stylus 3. Then the record disc 15 will *push* the upper end of the start switch button 39 before the record holder 12 arrives at the completely depressed position so that the contact 40 now being pushed by the start switch button 39 will engage the contact 41, thereby placing the start switch in an ON position. By this action, the motor 7 is energized and the turn table 9 is driven for sound reproduction.

Now, an explanation will be made of the electrical circuit of the present invention.

As shown in FIG. 5, reference numeral 42 denotes a battery case which receives a battery as a power source 22. Also, in FIG. 5, reference numeral 43 denotes a variable resistor, which is connected between the power source 22 and the motor 7 to drive the motor 7 at a suitable voltage. In the electrical circuit shown in FIG. 7, the contact 40 is connected to the metal guide plate 20, while the contact 41 is connected to the motor 7 and the metal spring 19, respectively. The other terminal of the motor 7 is serially connected via the power source 22 to the variable resistor 43 and the metal guide plate 20.

In operating the present sound reproducing device, the record disc 15 is initially inserted in the record fixing portion 10 of the record holder 12 as shown in FIG. 3. Then any desired recorded item shown in the indexing portion 14 of the record disc 15 is selected and the selection pole 16 corresponding to the selected recorded item is depressed. The selected selection pole 16 as shown, for example, in FIG. 8, will make one of the energizing pieces 18 of the metal spring 19 contact the metal guide plate 20. Thereby, as shown in FIG. 7, an electric circuit between the motor 7, the power source 22, the variable resistor 43, the metal guide plate 20 and the contact 41 of the start switch 7 can be established to start rotation of the motor 7 and the turn table 9. However, the stopper 17 is projecting radially outwardly from outer rotational periphery of the turn table 9 and rotates with the turn table 9. Since the forward tip end of the selected selection pole 16 has entered up to the circular locus of the stopper 17, the stopper 17 will strike the selection pole 16 in its advanced position and temporarily stop further rotation of the turn table 9. At this moment, the belt B slips relative to the rotating side periphery of the turn table 9. The position at which the turn table 9 has stopped is pre-selected so that the reproduction stylus 3 formed on the tone arm 5 on the turn table 9 can engage the selected groove on the record disc.

Next, release of the selection pole 16, will allow the selection pole 16 to return to its original position under the bias of the energizing piece 18 of the metal spring 19. At the same time, since the energizing piece 18 also moves away from the metal guide plate 20, electrical conduction between the metal guide plate 20 and the metal spring 19 is interrupted thereby stopping rotation of the motor 7. When the record disc 15 is engaged by the reproducing stylus 3 by swingably moving the record holder 12 into the window 1, the record disc 15 will push the start button 39. Thus, the contact 41 of the start switch engages the contact 40 and establishes an electrical circuit through the motor 7, the power source 22, the variable resistor 43, the metal guide plate 20, the contact 40 of the start switch and the contact 41 of the start switch to again cause rotation of the motor 7 and the turn table 9. Since the sound reproducing stylus 3 has already been positioned at the location where it can engage the selected record groove 13, the selected item on the record disc can be reproduced.

When the pickup arrives at the end point of sound reproduction, the cancel lever 37 will project radially outward from the upper face of the turn table 9 and urge the holder locking lever 38 to remove the hook 38a from the locking piece 32. In this way, the record holder 12 is tilted away from the window 1 and releases the record disc 15 from the applied stylus pressure, thereby enabling the record holder 12 to be removed from the window 1.

What is claimed is:

1. A sound reproducing selection apparatus for a simplified sound reproducing device comprising:
a casing;
an aperture formed in the casing;
a tone arm swingably mountable within the casing;
a center pin mounted within the casing;
a turn table rotatably supported by the center pin;
a sound reproducing stylus mounted on the tone arm and projecting toward the aperture in the casing;
an electric motor mounted within the casing for rotating the turn table;
a speaker diaphragm attached to the turn table opposite from the tone arm;
a record holder swingably attached at one end to the casing adjacent the aperture in the casing and having a record disc fixing portion formed at an opposite end;
first means for biasing the record holder away from the aperture in the casing;
the record holder being movable against the force of the first biasing means to a position parallel to the turn table;
a record disc having a plurality of record grooves formed therein, each of the record grooves having starting and end points of sound reproduction, the starting points of sound reproduction on each of the record grooves being spaced along the outer circumference of the record disc;
indexing means formed on the record disc for showing the item to be recorded in each record groove;
the record disc being insertable into the record holder with the indexing means being visible from outside of the record holder;
the sound reproducing stylus being engageable with the record disc when the record holder is urged against the force of the first biasing means;
means for temporarily stopping the sound reproducing stylus at a position in which the sound reproducing stylus can engage one of the record grooves in the record disc, the stopping means including;
(a) a plurality of selection poles corresponding in number to the number of record grooves on the record disc depressably mounted on the casing and extending into the casing;
(b) a stopper projecting radially outward from the outer periphery of the turn table and creating a locus of rotation about the periphery of the turn table upon rotation of the turn table; and
(c) the selection poles projecting onto the locus of rotation of the stopper when any one of the selection poles is depressed from outside of the casing;
a source of electrical power;
means for connecting the source of electrical power to the motor to rotate the motor after the sound reproducing stylus has engaged the selected record groove, the connecting means including:
(a) a plurality of electrically conductive energizing members respectively engageable with one of the selection poles;
(b) second means for biasing each of the selection poles toward the outside of the casing;

(c) a metal guide plate holding the selection poles along the periphery of the turn table and guiding the selection poles onto the locus of rotation of the stopper, the metal guide plate being capable of engaging the second biasing means;

(d) a projection formed on each of the selection poles, the projection urging the second biasing means into contact with the metal guide plate when the selection pole associated with the second biasing means is depressed; and (e) the second biasing means associated with one of the selection poles which is depressed and the metal guide plate forming a pair of contacts to complete a circuit between the source of electrical power and the motor to connect electrical power to the motor and cause rotation of the motor.

2. The sound reproduction selection apparatus of claim 1 wherein the second biasing means is formed as an annular ring disposed around the center pin and includes the energizing pieces mounted on and extending readily outward therefrom;

the selection poles being disposed to project from one side of the casing toward the locus of rotation of the stopper and located outside of the rotational circle of the turn table; and the metal guide plate being disposed and parallel with one side of the casing and facing the metal spring.

3. The sound reproduction selection apparatus of claim 1 further including a belt for connecting the motor and the turn table.

4. The sound reproduction selection apparatus of claim 3 wherein the outer circumferential wall of the turn table within which the speaker diaphragm is received is formed to act as a pulley around which the belt extends.

5. A sound reproduction selection apparatus for a simplified sound reproducing device comprising:

a casing;
an aperture formed in the casing;
a tone arm swingably mountable within the casing;
a sound reproducing stylus mounted on the tone arm and projecting toward the aperture in the casing;
a center pin mounted within the casing;
a turn table rotatably supported by the center pin;
an outer circumferential wall attached to the turn table opposite from the tone arm;
an electric motor mounted within the casing for rotating the turn table;
a speaker diaphragm attached to the turn table opposite from the tone arm;
a record holder swingably attached at one end to the casing adjacent the aperture in the casing and having a record disc fixing portion formed at an opposite end;
first means for biasing the record holder away from the aperture in the casing;
the record holder being movable against the force of the first biasing means to a position parallel to the turn table;
a record disc having a plurality of record grooves formed therein, each of the record grooves having starting and end points of sound reproduction, the starting points of sound reproduction on each of the record grooves being spaced along the outer circumference of the record disc;
indexing means formed on the record disc for showing the item to be recorded in each record groove;
the record disc being insertable into the record holder with the indexing means being visible from outside of the record holder;
the sound reproducing stylus being engageable with the record disc when the record holder is urged against the force of the first biasing means;
means for temporarily stopping the sound reproducing stylus at a position in which the sound reproducing stylus can engage one of the record grooves in the record disc, the stopping means including:
a plurality of selection poles corresponding in number to the number of record grooves on the record disc, depressably mounted on the casing and extending into the casing;
a stopper projecting radially outward from the outer periphery of the turn table and creating a locus of rotation about the periphery of the turn table upon rotation of the turn table;
the selection poles projecting onto the locus of rotation of the stopper when any one of the selection poles is depressed from outside of the casing;
a source of electrical power;
means for connecting the source of electrical power to the motor to rotate the motor after the sound reproducing stylus has engaged the selected record grooves, the connecting means including:
a plurality of electrically conductive energizing members respectively engageable with one of the selection poles;
a metal spring formed as an annular ring disposed around the center pin and includes the energizing pieces mounted on and extending readily outward therefrom for biasing each of the selection poles toward the outside of the casing;
a metal guide plate holding the selection poles along the periphery of the turn table and guiding the selection poles onto the locus of rotation of the stopper, the metal guide plate being capable of engaging the second biasing means;
a projection formed on each of the selection poles, the projection urging the second biasing means into contact with the metal guide plate when the selection pole associated with the second biasing means is depressed;
the metal spring associated with one of the selection poles which is depressed and the metal guide plate forming a pair of contacts to complete a circuit between the source of electrical power and the motor to connect electrical power to the motor and cause rotation of the motor;
the selection poles being disposed to project from one side of the casing toward the locus of rotation of the stopper and located outside of the rotational circle of the turn table;
the metal guide plate being disposed and parallel with one side of the casing and facing the metal spring;
the outer circumferential wall of the turn table within which the speaker diaphragm is received being formed as a pulley; and
a belt connecting the motor and the turn table.

* * * * *